UNITED STATES PATENT OFFICE.

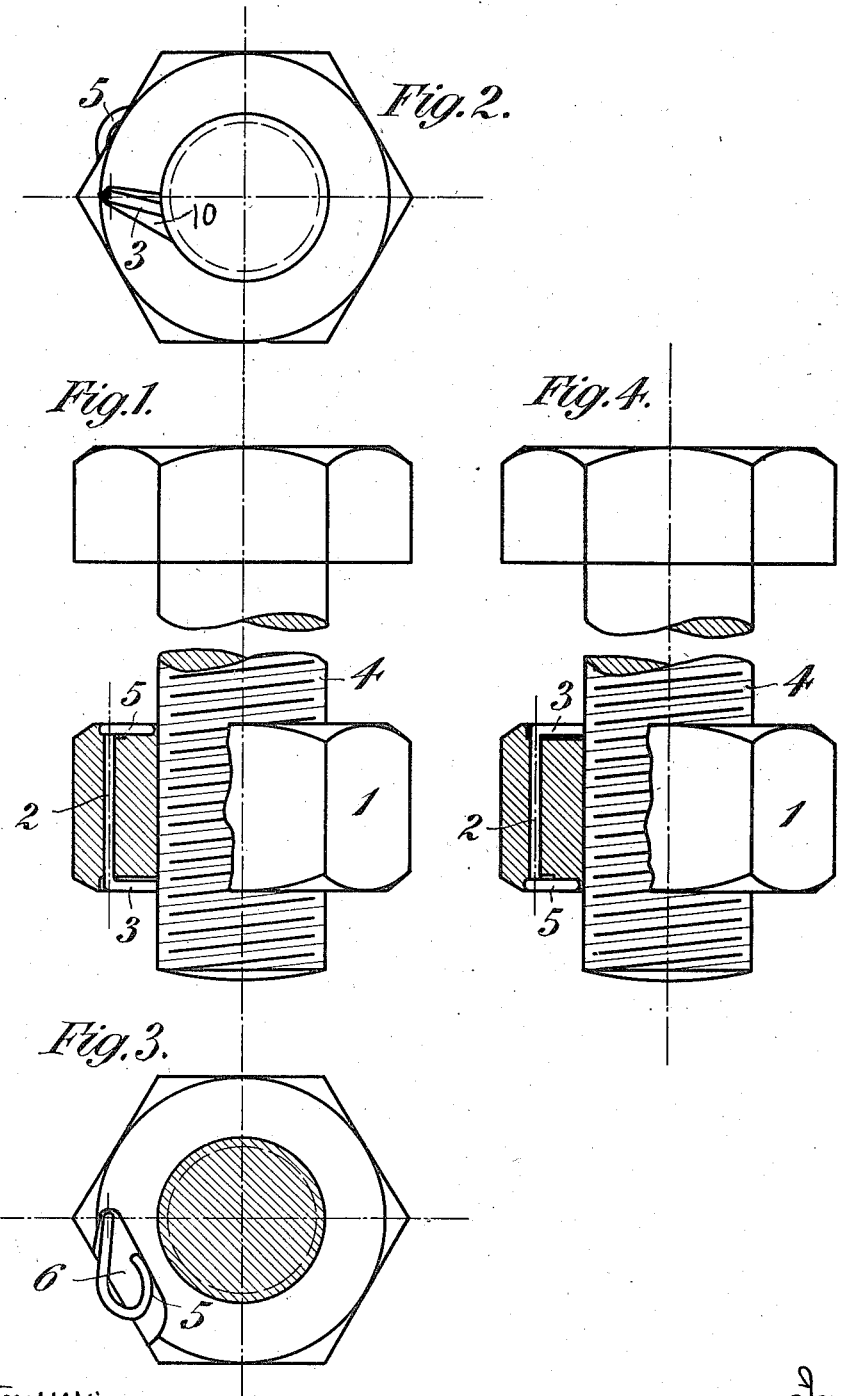

SCHLAMA PIUS, OF WARSAW, RUSSIA, ASSIGNOR OF TWO-FIFTHS TO AKTIEN-GESELLSCHAFT WARSCHAUER SCHRAUBEN UND DRAHTFABRIKEN, OF WARSAW, RUSSIA.

NUT-LOCK.

1,062,357.      Specification of Letters Patent.      Patented May 20, 1913.

Application filed May 31, 1912. Serial No. 700,606.

*To all whom it may concern:*

Be it known that I, SCHLAMA PIUS, subject of the Czar of Russia, residing at 60 Leszno street, Warsaw, Russia, have invented certain new and useful Improvements in Nut-Locks, of which the following is a specification.

My invention relates to an improvement in nut locks, and has for its principal object to provide simple means whereby a nut may be locked against accidental movement on the bolt.

The invention includes, as an essential feature, a locking member which is preferably made of resilient material and is provided at one end with a suitable pawl and its opposite end is enlarged, preferably to form a loop engaging the edge or wall of a recess formed in the nut.

In the accompanying drawing, wherein the invention is illustratively exemplified, Figure 1 is an elevational view of a fragment of a bolt having in position thereon my improved lock nut partly in section; Fig. 2 is a bottom plan view of the nut; Fig. 3 is a top plan view of the nut the bolt head being omitted and Fig. 4 is a view similar to Fig. 1, showing a modification.

An ordinary nut 1 of any size is provided with a transverse recess or slot 10 near one edge thereof, into which slot a wire 2 is inserted; the end 3 of the wire 2 is bent at a suitable angle to form a pawl and engages in the screw-thread of the bolt 4, substantially at right angles to the longitudinal apex of the bolt while the second end 5 of the wire 2 is bent substantially at a right angle to the wire 2 and formed into a loop which is positioned in, and bears against a wall or edge of, a recess 6 formed in the nut so that the wire 2 has a spring action and when the loop end 5 is pressed, the pawl end 3 is removed from the screw-thread of the bolt 4. The pawl end 3 prevents the accidental loosening of the nut which can only be screwed lower on to the bolt; if the lowering of the nut is desired, it is sufficient to press the loop end 5 whereby, as stated above, the pawl end 3 is removed. Provided that the nut is not completely screwed on to the bolt, the modified construction, as shown in Fig. 4, is then utilized. This construction only differs from that above described in that the loop end 5 is located below the pawl end 3.

I claim—

1. In a nut lock, the combination with a bolt and a nut provided with a transverse bore of a resilient locking member passing through said bore, said locking member having one end formed as a pawl for engaging the threads of the bolt and the opposite end formed into a loop and engaging the wall of a recess in said nut, whereby the end of said loop engaging the wall of said recess will maintain said pawl in engagement with the threads of the bolt.

2. In a nut lock, the combination with a bolt, of a nut having a transverse bore therein near one edge thereof and a recess formed in one face of said nut, and a resilient locking member having a portion thereof passing through said bore, one end of said locking member formed as a pawl to engage the threads of the bolt and the other end of said locking member formed as a loop bearing against a wall or edge of said recess.

In testimony whereof I affix my signature in presence of two witnesses.

SCHLAMA PIUS.

Witnesses:
    FRANCIS TREMBICK,
    THOMAS MILES.